(12) United States Patent
Andrews et al.

(10) Patent No.: US 9,836,543 B2
(45) Date of Patent: *Dec. 5, 2017

(54) AUTOMATICALLY SELECTING ADDRESSEES FOR RECEIVING A CONTENT ITEM

(71) Applicant: LinkedIn Corporation, Mountain View, CA (US)

(72) Inventors: June H. Andrews, San Francisco, CA (US); Jason R. Schissel, Mountain View, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 14/626,006

(22) Filed: Feb. 19, 2015

(65) Prior Publication Data

US 2015/0281137 A1      Oct. 1, 2015

Related U.S. Application Data

(63) Continuation of application No. 14/229,578, filed on Mar. 28, 2014, now Pat. No. 9,021,040.

(51) Int. Cl.
| | |
|---|---|
| H04L 12/58 | (2006.01) |
| H04L 12/18 | (2006.01) |
| H04L 29/08 | (2006.01) |
| G06F 15/16 | (2006.01) |
| G06F 17/30 | (2006.01) |
| H04L 12/733 | (2013.01) |
| G06Q 50/00 | (2012.01) |

(52) U.S. Cl.
CPC ....... *G06F 17/30864* (2013.01); *G06Q 50/01* (2013.01); *H04L 12/185* (2013.01); *H04L 12/588* (2013.01); *H04L 45/20* (2013.01); *H04L 51/28* (2013.01); *H04L 51/32* (2013.01); *H04L 67/22* (2013.01)

(58) Field of Classification Search
CPC ..... H04L 12/588; H04L 12/185; H04L 51/28; H04L 51/32; H04L 67/22; G06F 17/30864; G06Q 50/01
See application file for complete search history.

(56) References Cited

U.S. PATENT DOCUMENTS

| | | |
|---|---|---|
| 8,010,460 B2 | 8/2011 | Work et al. |
| 8,402,374 B1 | 3/2013 | Rose |
| 9,021,040 B1 | 4/2015 | Andrews |
| 2012/0072432 A1 | 3/2012 | Crosa et al. |

(Continued)

*Primary Examiner* — Larry Donaghue
(74) *Attorney, Agent, or Firm* — Park, Vaughan, Fleming & Dowler LLP (57) ABSTRACT

A system, method, and apparatus are provided for distributing a content item toward target recipients solely via first degree connections (e.g., in a professional network, in a social network). For a selected content item and identified target recipients of the item, when a user initiates a message to forward or otherwise convey the content item, one or more schemes are applied to select and automatically populate the message with suitable addressees. In one scheme, values are computed for each neighbor of the sender, to indicate the value of delivering the item to that neighbor; the message is automatically addressed to the highest-value neighbors. In another scheme, user communities that encompass the target recipients are identified and the message is automatically addressed to neighbors that are best able to disseminate the item throughout a community. In another scheme a minimal set of neighbors having connections to all target recipients is identified.

42 Claims, 6 Drawing Sheets

(56) References Cited

U.S. PATENT DOCUMENTS

| | | |
|---|---|---|
| 2012/0191715 A1 | 7/2012 | Ruffner et al. |
| 2012/0191776 A1 | 7/2012 | Ruffner et al. |
| 2012/0203846 A1 | 8/2012 | Hull et al. |
| 2012/0246244 A1 | 9/2012 | Mallet et al. |
| 2013/0031090 A1 | 1/2013 | Posse et al. |

AUTOMATICALLY SELECTING ADDRESSEES FOR RECEIVING A CONTENT ITEM

RELATED APPLICATION

This application is a continuation of and claims priority under 35 U.S.C. §120 to pending U.S. patent application Ser. No. 14/229,578, filed Mar. 28, 2014.

BACKGROUND

This disclosure relates to the field of computer systems. More particularly, a system, apparatus, and methods are provided for automatically populating an addressee field of a message when the sender of the message transmits or forwards a content item.

A recipient of a content item such as a video clip, an audio file, or a document, is often more receptive to or more interested in the content when he or she knows or has some personal or professional connection to the sender. For example, when a user of an online service receives content forwarded from a friend who also uses the service, he or she generally is more likely to consume it (e.g., watch it, listen to it, read it) than if it was blindly sent by the service or by some other entity with which he or she has no personal or professional connection.

However, content originators and other entities that wish to distribute content to users matching some target criteria (and/or particular users) generally do not have close connections to all of the target users. They may therefore be limited to traditional solutions such as paying a publisher (e.g., a web site operator) to place their content before those users. The target users, however, may be likely to ignore the content because it is deemed to be an advertisement or other blindly delivered message.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention or inventions associated with this disclosure are not intended to be limited to the embodiments shown, but rather are to be accorded the widest scope consistent with the disclosure.

In some embodiments, a system, apparatus, and methods are provided for automatically populating the addressee field of a message (e.g., an electronic mail message, an instant message) for transmitting or forwarding an item of content, with one or more strategically selected addressees, based on the content and the sender of the message. In different contexts, this action may be described as automatically addressing the message, auto-populating the message with addressees, or something similar.

Stated differently, the system, apparatus, and methods facilitate delivery of a selected content item to target recipients solely via messages initiated by first degree connections (i.e., people the recipients know).

In these embodiments, even if the automatically selected addressees are first degree connections, measures may be taken to avoid distributing the content in a "spam-like" manner. For example, each time the content item is sent, a limited number of auto-populated addressees may be included. This number may be a predefined limit (e.g., 5, 10, 20) or may be based on a dynamic calculation that considers who is sending the message, the type of content, the value of delivering the content to or through a particular recipient, and/or other factors. Another measure that may be taken is to ensure that once the content item is sent to or delivered to a particular recipient, that recipient is never again automatically selected as a recipient.

Figure 1:
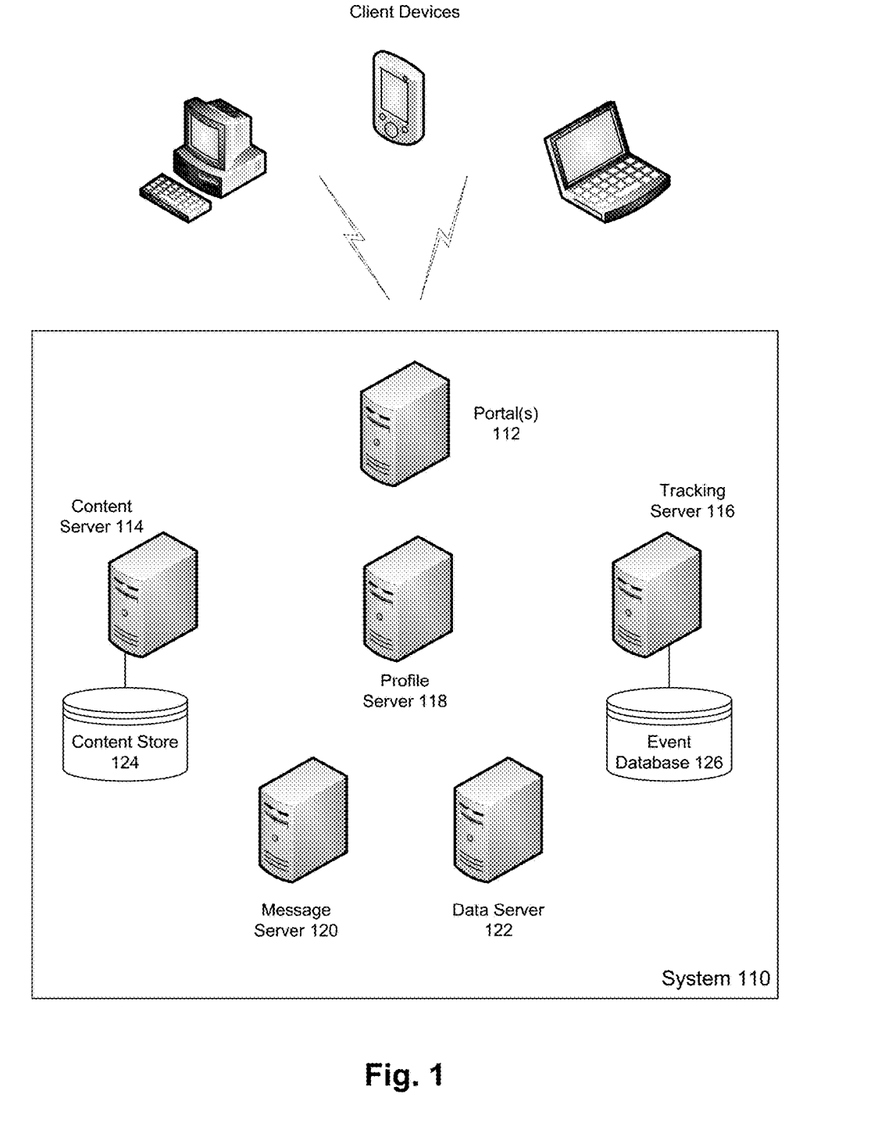
FIG. 1 is a block diagram depicting a computing environment for auto-populating an addressee field of a message, in accordance with some embodiments.

FIG. 1 is a block diagram of a system in which a message that will transmit a content item is automatically populated with one or more addressees, according to some embodiments. System 110 may be implemented as or within a data center or other computing system.

In some particular implementations, system 110 is operated within a professional or social networking service or system that helps members create, develop, and maintain professional (and/or personal) relationships, as provided by LinkedIn® Corporation, for example.

Members or users of a service offered by system 110 connect to the system via client devices, which may be stationary (e.g., desktop computer, workstation) or mobile (e.g., smart phone, table computer, laptop computer). The client devices operate suitable client applications, such as a browser program, an electronic mail program, or an application designed specifically to access the service(s) offered by system 110. Users of system 110 may be termed members because they may be required to register with the system in order to fully access the system's services.

As part of the services it offers, system 110 serves content for presentation to users via their client devices. The content that is served may include media files, advertisements, offers, announcements, job listings, status updates, news, messages, and so on, and may be or may include any type of media (e.g., text, images, video, audio). System 110 may serve content generated by or among users of the system's services, and/or content supplied by third parties for delivery to users of those services.

User/member connections are generally made through portal(s) 112, which may comprise an application server, a web server, and/or some other gateway or entry point. System 110 also includes content server 114, tracking server 116, profile server 118, message server 120, data server 122, content store 124, and event database 126.

Members of the service have corresponding pages (e.g., web pages, content pages) on system 110, which they may use to facilitate their activities with the system and with each other. These pages (or information provided to members via these pages) are available to some or all other members to visit in order to browse messages, announcements, and/or other information provided by or associated with the corresponding member.

Tracking server 116 monitors and records activity of system 110 and/or members (e.g., in event database 126). For example, whenever content is served from portal 112 or content server 114 (e.g., to a client device), the tracking server may record what is served, to whom (e.g., which member), when it was served, and/or other information. Other information may include how it was delivered (e.g., via a web page, via electronic mail, via instant message). Similarly, the tracking server also records member actions regarding advertisements and/or other content presented to the members, to include identities of the member and the content acted upon, the action that was taken (e.g., click, conversion, follow-on request, visiting a page associated with a subject or provider of the content, forwarding the content), when the action was taken, etc.

Content server 114 maintains one or more repositories of content items for serving to members (e.g., content store 124), an index of the content items, and/or other information useful in serving content to members. Illustratively, content server 114 may serve on the order of hundreds of millions of content items every day, for each of which tracking server 116 stores an event record (in addition to data reflecting other user activity, as described above).

As indicated above, content store 124 may include various types of content and content items, including advertisements (e.g., both revenue and non-revenue ads), information released by members and possibly non-members (e.g., announcements, messages), status updates, job listings/descriptions, media content (e.g., images, video, audio), documents, and so on, for serving to members and/or for use by various components of system 110. Content server 114 (or some other component of system 110) may include a recommendation module for recommending content to serve to a member, and/or the system may apply recommendations generated by an external entity.

Profile server 118 maintains profiles of members of the service(s) hosted by system 110 (e.g., in a profile database not depicted in FIG. 1). An individual member's profile may reflect any number of attributes or characteristics of the member, including personal (e.g., gender, age or age range, interests, hobbies, member ID), professional (e.g., employment status, job title, functional area or industry, employer, skills, endorsements, professional awards, co-workers), social (e.g., organizations the user is a member of, geographic area of residence, friends, associates), educational (e.g., degree(s), university attended, other training), user/member communities the member belongs to, etc. A member's profile, or attributes or dimensions of a member's profile, may be used in various ways by system components (e.g., to identify who sent a message, to select recipients of a message, to identify a recipient of a status update, to record a content-delivery event).

With the data it maintains, profile server 118 can identify, for each given member, other members that the given member is connected to (e.g., as friends or associates). Thus, not only can system 110 map or graph the entire network of members and member connections, with nodes representing members and edges representing member connections, for example, it can also identify sub-networks having any desired locus or nexus (e.g., an institution common to a set of members, a field of endeavor shared by multiple members). Thus, if a goal arises of delivering a particular content item to a particular member, but only through member connections (e.g., messages between members), the system can readily identify one or more paths to the member. The terms "sub-network" and a member/user "community" may be used interchangeably in the following discussion.

Organizations may also be members of the service (i.e., in addition to individuals), and may have associated descriptions or profiles comprising attributes such as industry (e.g., information technology, manufacturing, finance), size, location(s), goal, products, services, etc. An "organization" may be a company, a corporation, a partnership, a firm, a government agency or entity, a not-for-profit entity, an online community (e.g., a user group), or some other entity formed for virtually any purpose (e.g., professional, social, educational).

Message server 120 may host an electronic mail program, a chat or instant message program, or some other type of messaging program. Although depicted as part of system 110 in FIG. 1, in some other embodiments the message server may be operated by a third party and therefore may be remote from system 110. In the latter embodiments, however, one or more components of system 110 (e.g., data server 122) are capable of generating and/or formatting messages, or at least auto-populating an addressee field of a message generated by the message server, through an API (Application Programming Interface) or other mechanism.

As described in more detail below, data server 122 facilitates auto-population of the addressee fields of messages that are initiated by members for distribution by message server 120. In particular, when a member chooses to send (or forward) a predetermined content item, the addressee field will be automatically populated with one or more addressees selected by the data server. Depending on various factors, including the sender, the content item, previous distribution of the content item, the sender's connections (i.e., friends, associates of the sender), and so on, different messages may be auto-populated with different numbers of addressees.

System 110 may include other components not illustrated in FIG. 1. For example, for each member of the system's service(s), system 110 may store a record of content items served to the member, or served for presentation to the member, and when they were served. Such a data store may be configured to allow the content server and/or other components of system 110 to quickly determine whether a particular content item was previously presented to a particular member, how many times it was presented, when it was presented, how it was presented (e.g., via electronic mail, via web page, how prominently or where it was presented within a page of content), and/or other information. Although some of this data may duplicate what is stored in event database 126, contents of this member data store would be rapidly accessible to one or more other servers (e.g., content server 114, data server 122), and may be used, for example, to help select a content item to serve in response to a current request or to help select recipients of a content item.

The functionality of system 110 may be distributed among the illustrated components in an alternative manner, such as by merging or further dividing functions of one or more components, or may be distributed among a different collection of components. Yet further, while implemented as separate hardware components (e.g., computer servers) in FIG. 1, one or more of portal 112, content server 114, tracking server 116, profile server 118, message server 120, and data server 122 may alternatively be implemented as separate software modules executing on one or more computer servers. Although only single instances of each component of system 110 are illustrated in FIG. 1, it should be understood that multiple instances of some or all components may be employed.

In some embodiments, a method of auto-populating an addressee begins after a content item is selected and after a set of one or more target recipients of the item have been identified. As indicated above, the content item may be of any type or form that is transmittable as part of or as an attachment to a message.

Target recipients may be identified in different ways in different scenarios. For example, one member of a service offered by system 110 of FIG. 1 may submit a content item that the member desires to have delivered to specific other members (e.g., identified by name or other identifier), to other members having one or more specific attributes or characteristics (e.g., graduates of a particular university, employed by a particular company, working in a particular field, living in a particular area), or to other members the system considers as possibly being interested in the item.

In different scenarios, therefore, in order to identify target recipients the system may consider different attributes of members or users (e.g., as maintained by profile server 118 of FIG. 1), connections between members—which may include the entire network of member connections or any portion(s) thereof—as well as characteristics of the content item and/or of the member who is sending the content item. Any or all data retained within the system may be considered by a recommendation engine, fit model, or other means for identifying the candidate recipients, and these means may be internal or external to the system.

By way of illustration, and not limitation, a network of all members and member connections that may be supported by methods described herein may include hundreds of millions of nodes (e.g., 290 million) and over 10 billion edges (e.g., 13 billion), wherein each node represents one member and each edge represents a connection between two members. The edges may or may not be homogeneous in nature. In other words, some edges may represent explicit member connections (e.g., formal "friend" or "associate" links), while others may represent implied or implicit connections (e.g., a connection between two members who have something in common, or who interacted without having a formal connection).

In some implementations, each target recipient is weighted according to the fit or compatibility between the content item and that target recipient, such as with a value between −1 and 1, inclusive (i.e., [−1, 1]), or between 0 and 1, inclusive (i.e., [0, 1]), wherein higher values represent greater correlation or a better fit. Or, target recipients may be weighted with one value (e.g., 1), while all members who are not target recipients are weighted with another value (e.g., 0).

Thus, the system may determine, among all members or a subset of all members, not only which members are desired or intended recipients of a given content item, but which members are the most (or least) suitable. With this determination, when a member chooses to transmit that content item the system may auto-populate the sender's message with addressees that include one or more target recipients and/or other members or users that are in or on paths to or toward at least one target recipient.

As the content item is distributed throughout the system's member/user network, a version of the network tailored to the item may be updated accordingly. For example, once a particular member receives the content item (e.g., via a message with an auto-populated addressee field), the system will bias against delivering it to that member again; in particular, some edges of the tree that would cause it to be delivered again may be pruned.

Also, a collection of addressees pre-identified for auto-population for a particular member, before that member actually forwards or sends the content item, may be updated based on other members' activities. For example, if the system determines that another member is not going to send the item, or likely will not send it, the pre-identified addressees may be augmented with addressees that would have been used to populate a message sent by the other user. Alternatively, if the other member does forward the content item, the pre-identified addressees may be pruned to remove addressees or paths used by the message sent by the other member.

It may be noted that when auto-population of an addressee field is active for a given content item, applicable parameters may vary from one scenario to another (e.g., based on the sender, the sender's neighborhood, the content item). For example, the maximum number of auto-populated addressees may vary, the sender may or may not be able add additional addressees, the sender may or may not be able to remove an auto-populated addressee, the sender may or may not be able to cancel the message before sending it, the sender may or may not be able to send it more than once, etc.

In different embodiments or scenarios, different schemes for selecting addressees with which to automatically populate a message that conveys a given content item may be applied. The same scheme or different schemes may be applied for different items, at different times, for different target recipients, for different senders. Illustrative schemes described herein include a "value-function" approach, a "community propagation" approach, and an "inverted Steiner tree" approach. It may be noted that while embodiments described below limit auto-populated message addressees to first degree connections of the sender, this restriction is not required in all embodiments.

Figure 2:
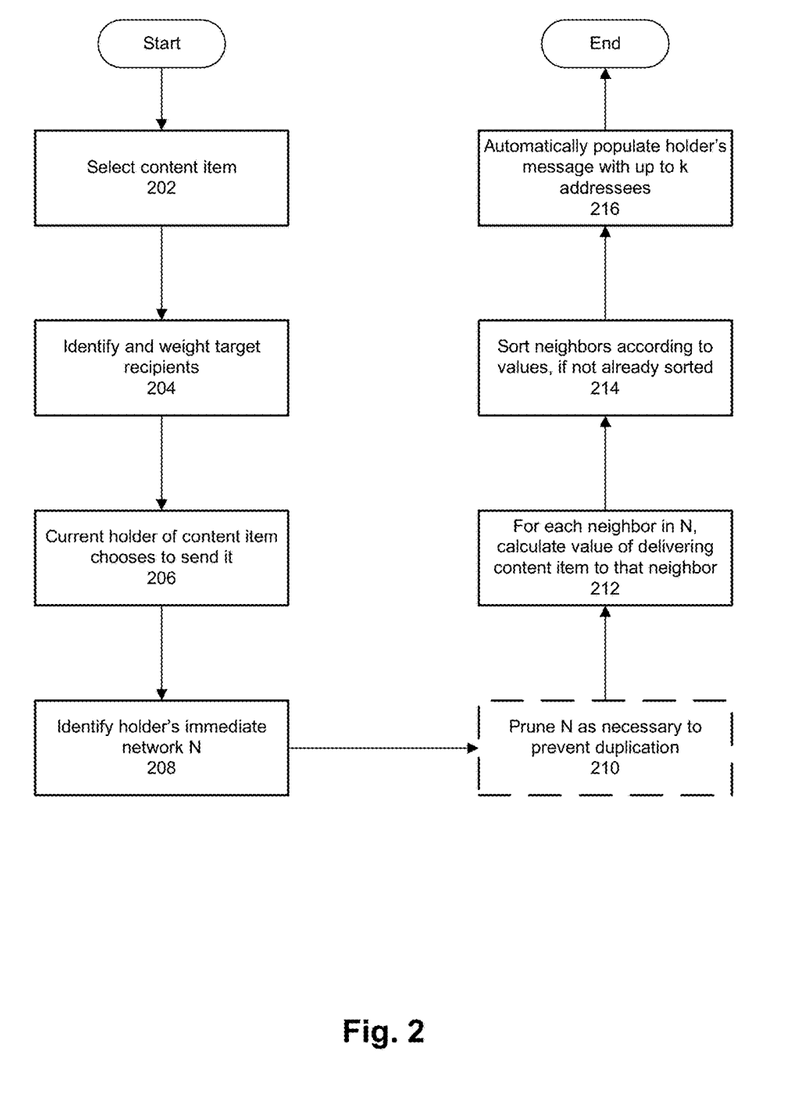
FIG. 2 is a flow chart demonstrating a value-function scheme for selecting addressees with which to automatically populate a message that will forward or otherwise convey a particular content item, in accordance with some embodiments.

FIG. 2 is a flow chart demonstrating a value-function scheme for selecting addressees with which to automatically populate a message that will forward or otherwise convey a particular content item, according to some embodiments. This method is employed within or in support of a professional network or social network comprising a large number of members and member connections.

In operation 202, a content item is identified for which auto-population of addressee fields is to be applied when the item is transmitted via electronic message. The item may be selected by a member, may be selected by the system (e.g., an operator of the system, a recommendation engine), or by some other entity (e.g., an item sponsor that is not a member of the system). An item may be selected because a member or other user is sponsoring its distribution, because the system is doing so as a public service or to enhance its members' experiences with the service, and/or for some other reason.

As illustrative but not limitative examples, a musical group may wish to publicize a new song or music video, an employer may want to distribute notification of a job opportunity to suitable people, a vendor may want to distribute an offer regarding a new product, etc.

In operation 204, multiple target recipients of the content item are identified and weighted. As discussed above, this may be performed in virtually any manner, using any suitable method, and may be performed by the same system that will auto-populate message addressee fields, or by some other entity. The weights correspond to the measured or perceived desirability of delivering the selected content item to the target recipients. Thus, it is more desirable to deliver the content item to a first target recipient having a relatively high weight (e.g., near 1) than to deliver the content item to second target recipient having a relatively low weight (e.g., negative or near 0).

Illustratively, the identified target recipients may be some number or percentage of members having the top weights, may be all members having weights above a threshold or cut-off weight, or may be delineated in some other fashion. A goal of the illustrated method may be to deliver the content item to all of the target recipients or to at least some percentage of them (e.g., 80%).

In some embodiments, a member's weight may be computed as a distance, within a defined space, between vectors representing the member and an "ideal" target recipient of the content item (e.g., a hypothetical recipient having attributes deemed most compatible with or most complementary to the item). For example, the content item and the member may be graphed or modeled as vectors within an m-dimensional space (m≥2) in which each dimension corresponds to an attribute of a target audience of the item (e.g., the target recipients). Illustrative attributes include industry, skills, engagement level, location, education, and so on. In some implementations, the cosine difference between the member's vector and the ideal recipient's vector is calculated and adopted as the member's weight.

In other embodiments, other methods may be used to compute members' weights.

In operation 206, a current holder or possessor of the selected content item chooses to forward the content item or to send it within a newly generated message. Illustratively, this holder may be the member or other party who selected the item in operation 202 or who created or first received it from its originator. For example, an employment recruiter who creates a new job opening notification or job posting may activate a process for generating a message to share it with some members.

In operation 208, the system begins the process of identifying whether and how to auto-populate the holder's message that will convey the content item. In particular, the holder's immediate network N is identified, which includes all first degree member connections or, in other words, all system members who are directly connected to the holder within the overall member network.

In some implementations, this network N is restricted to immediate neighbors with whom the current holder of the content item previously interacted. Such interaction may include exchange of at least one message, commenting on or sharing by the immediate neighbor on a post made by the current holder (or vice versa), endorsing a skill of the holder by the immediate neighbor (or vice versa), etc. This restriction eliminates first degree connections with whom the sender really has only a tenuous connection.

In optional operation 210, network N is pruned to remove any members who previously received the selected content item, or at least those members who received the content item via a message that featured an auto-populated addressee field.

In operation 212, for each other member in the holder's network N, the system calculates a perceived value of sending or delivering the selected content item to that member. In different embodiments, this value may be calculated in different ways, but generally will yield numerical results for each neighbor within N. The higher the value, the higher the perceived benefit of putting the content item in the possession of the corresponding neighbor.

In some implementations, the following value function is applied to calculate the value V of each first degree connection i of the current holder; TABLE 1 defines the components of this function:

$$V(i)=w(i)+\lambda(i)(\Sigma_{n\in[1,k]}L[n]) \quad (1)$$

wherein L=sort[V(j) f or j∈N(i)].

TABLE 1

| Component | Definition |
|---|---|
| i, j | Members |
| V(i) | Value of getting the content item to member i |
| w(i) | Weight of member i |
| λ | Probability that member i will forward/send the content item |
| k | Maximum number of addressees to auto-populate |
| sort | Sort, from highest to lowest |
| N(i) | Neighbors of member i who have not yet received the item |

Thus, the value of getting the selected content item to a member i is based on the weight of that member, which was calculated by the system as part of identifying the target recipients or was received from another entity that identified the target recipients. To this base value is added the product of the probability λ that the member will forward/send the content item and the summation of the calculated values of getting the content item to each of the top-rated k immediate neighbors of i who have not already received it (or at least have not received it via a message having an auto-populated addressee field).

As indicated, the variable k identifies the maximum number of neighbors (i.e., first degree connections) of member i with which to auto-populate the message when member i sends the content item. The value of k may vary from one member to another and for one content item to another, and is configured to prevent inadvertent spamming of a member's network. In some implementations, k is set as the maximum of two values—a predetermined constant (e.g., 10, 20, 30) and a percentage or a portion of the number of users in the sending member's network N (e.g., 15%, 20%, 25%).

A result of equation (1) is a sorted list of up to k neighbors—in particular, the k neighbors that are estimated to yield the greatest value (according to the value function) upon delivery of the selected content item.

In operation 214, the list is sorted if it was not already sorted during computation of the neighbors' values. Equation (1) includes a sort operation, but other value functions may not, and the results of these functions would therefore be ordered according to value.

In operation 216, the message initiated by the current holder of the content item is automatically populated with up to k neighbors identified by the value function. The method of FIG. 2 then ends or, after the content item is received by an auto-populated addressee, the method may be repeated if and when that recipient chooses to forward the received message or to send the content item in a new message.

In some embodiments, full or partial values can be pre-computed for some or all members in the member network, instead of computing the values on-the-fly at the time a possessor of the item chooses to send it. For example, each member's weight can be computed (e.g., as part of the process of identifying target recipients), and then the network (or some portion of the network) may be traversed to compute each member's value. Even in a very large network, this may be a relatively lightweight computation requiring no more than a few traversals of the entire network.

A second method of selecting addressees with which to automatically populate a message that conveys a selected content item is termed a "community propagation" method. A focus of this approach is delivering the content item to selected "communities" of members and propagating it throughout those communities.

Figure 3:
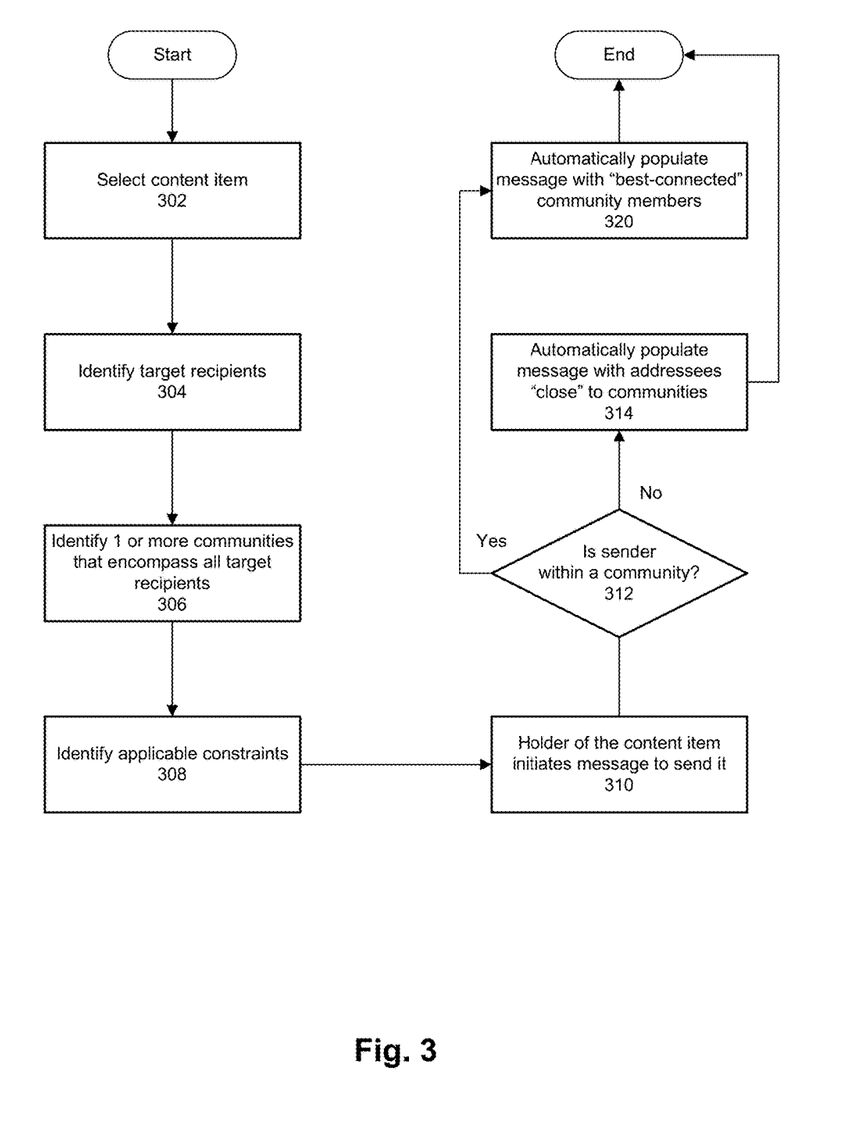
FIG. 3 is a flow chart demonstrating a community propagation scheme for selecting addressees with which to automatically populate a message that will forward or otherwise convey a particular content item, in accordance with some embodiments.

FIG. 3 is a flow chart demonstrating a community propagation scheme for selecting addressees with which to automatically populate a message that will forward or otherwise convey a particular content item, according to some embodiments. This method is employed within or in support of a professional network or social network comprising a large number of members and member connections.

In operation 302, a content item is identified for delivery via messages exchanged by first degree connections. The item may be selected by a member, may be selected by the system (e.g., an operator of the system, a recommendation engine), or by some other entity. An item may be selected because a member or other user is sponsoring its distribution, because the system is doing so as a public service or to enhance its members' experiences with the service, and/or for some other reason.

In operation 304, one or more target recipients of the content item are identified. As discussed above, this may be performed in virtually any manner, using any suitable method, and may be performed by the same system that will auto-populate message addressee fields, or by some other entity.

In some implementations, weights are computed for possible target recipients and the identified target recipients may be some number or percentage of possible target recipients having the highest weights.

Alternatively, criteria specified for identifying target recipients may be applied, and the identified target recipients may include all members who match (or sufficiently match) the criteria. Thus, in this alternative implementation, identifying target recipients among all members may be a binary process of determining whether a given member does or does not (sufficiently) match the criteria.

Such criteria may consider any portion of members' profiles which, as described above, may include myriad attributes. For example, the criteria may indicate that the content item should be targeted at members matching all of a specified set of criteria, such as, for example: a specific age (or age range), graduation from a particular university, employment in a particular industry and/or functional area.

As a result of operation 304, a set of target recipients is identified, to whom the system will attempt to deliver the content item via messages from first degree connections that are automatically populated with addressees that will increase the likelihood that the item reaches the target recipients.

In operation 306, communities of members that encompass each target recipient are identified or defined. A given target recipient may be encompassed by multiple communities, but each target recipient will be a member of at least one.

Each community is defined by some attribute or attributes that is or are common to all members of the community, and/or as a collection of members who interact relatively frequently. The attributes that define the communities may match or be a subset or a superset of the attributes that were used to identify the target recipients. In some scenarios, there may be close correlation between target recipients and communities, so close even that a given community (or all communities) may include only target recipients and few or no members who are not target recipients. On the other hand, target recipients may match a relatively narrow set of attributes, while their corresponding communities are defined more broadly.

In different embodiments, different techniques or methods may be applied to identify target recipients' communities, such as (but not limited to) clique-based methods, hierarchical clustering, minimum-cut methods, modularity maximization, seed node expansion algorithms, etc.

One goal of identifying target recipients' communities is to identify portions or sub-networks of the overall member network that the content item should be delivered to. Once a message that conveys the content item enters a community, a complementary goal is to disseminate the content item throughout the community, but to limit or prevent distribution outside of the community by anyone within the community (unless doing so is the best or only way to reach another target recipient).

In operation 308, applicable constraints or restraints are identified, if any. For example, it may be determined that the sender of a message that conveys the selected content item may not (or may) be able to select as a manually populated addressee anyone who is not within an identified community.

As another example, it may be specified that the method terminates when some number or percentage of all target recipients have received the content item; after this termination point is reached, new messages that convey the content item will not be automatically populated as described herein.

As yet another example constraint, a maximum hop count may be identified for reaching a community. Illustratively, when a given member generates a message to forward or send the content item, if no community (i.e., a member of an identified community) can be reached via first degree connections from the given member without exceeding the maximum hop count, then the message's addressee field may not be auto-populated at all.

Yet other constraints or restrictions may be applied in other implementations, to limit the total number of messages that will be auto-populated with addressees, to set a maximum number (e.g., k) of auto-populated addressees, to identify a maximum number of members to which the content item may be delivered via auto-population of their addresses, to set a date/time limit regarding auto-population, to allow or not allow repeat delivery of the content item to a member, etc.

In operation 310, a member who currently possesses the content item initiates a message to send or forward it.

In operation 312, the system determines whether the sending member is within an identified community. If so, the method advances to operation 320; otherwise, the method continues with operation 314.

In operation 314, the system identifies one or more addressees with which to auto-populate the message's addressee field. If the sending member is directly connected to members of one or more identified communities, some or all of them will be selected as auto-fill addressees (perhaps subject to a maximum number k of auto-fill addressees).

If, however, the sender is not directly connected to members of any community, or is not connected to members of at least a threshold number or percentage of identified communities, the addressee field may be auto-populated with one or more addressees that are determined to be able and/or likely to forward the content items such that they will enter one or more communities. For example, all of the sending member's immediate neighbors (in his/her neighborhood N) may be analyzed to determine which are most closely connected to members of the communities, which are most likely to forward a message (e.g., based on past message histories), which are most closely related to target recipients and/or community members (i.e., based on similarities with the criteria used to select target recipients/communities), etc.

After operation 314, the method may end or may return to operation 310 if and when a recipient of this message chooses to forward the content item.

In operation 320, the content item is being sent by a member of an identified community, and the system will act to further the distribution of the item within that community and especially to target recipients within the community. In particular, if the item has not yet been delivered to all members of the community, the system will identify one or more fellow community members with which to auto-populate the addressee field. Community members who have already received the content item may be eliminated from consideration, and the maximum number of auto-populated addressees (e.g., k) may be different from other situations (e.g., when a non-community member is sending the content item as in operation 314).

In some implementations, for the purpose of selecting addressees community members may be ranked in terms of their connectedness, based on their number of (first degree) connections that are also within the community, the percentage of all of their (first degree) connections that are with other members of the community (and/or members of other identified communities), their centrality measures, and/or other factors. The message's addressee field is then auto-populated with some number of community members (e.g., the k members with the top rankings), assuming not all of them have already received it.

In some situations, operation 320 (and/or operation 314 above) may terminate without auto-population of a message. For example, by the time this erstwhile sender initiates a message, there may be no suitable paths toward a target recipient that do not involve sending the message to someone who has already received the content item.

After the message is sent, the method may end or may return to operation 310 if and when a recipient of the message chooses to forward the content item.

In some embodiments, if the first member to send the selected content item is within one of the identified communities, in order to allow the item to reach other communities a special allowance may be made to auto-populate the member's message with addressees outside of that community (if more than one community has been identified). Similarly, if the first sender is not within any of the communities, his or her message may be auto-populated with any number of addressees (i.e., no limit) and/or may not be restrained by any maximum hop count restriction for reaching a community.

In some other embodiments, if a given sender of the selected content item is not a member of an identified community and is not directly connected to (or within a maximum number of hops of) a community member, some other method or methods may be applied to identify addressees for auto-populating the message with suitable addressees (e.g., the value-function approach discussed above, the inverted Steiner tree approach discussed below).

A third method of selecting addressees with which to automatically populate a message that conveys a selected content item is termed an "inverted Steiner tree" method. A focus of this approach is getting a content item to target recipients via few hops (e.g., using the fewest possible number of messages having auto-populated addressee fields).

Figure 4:
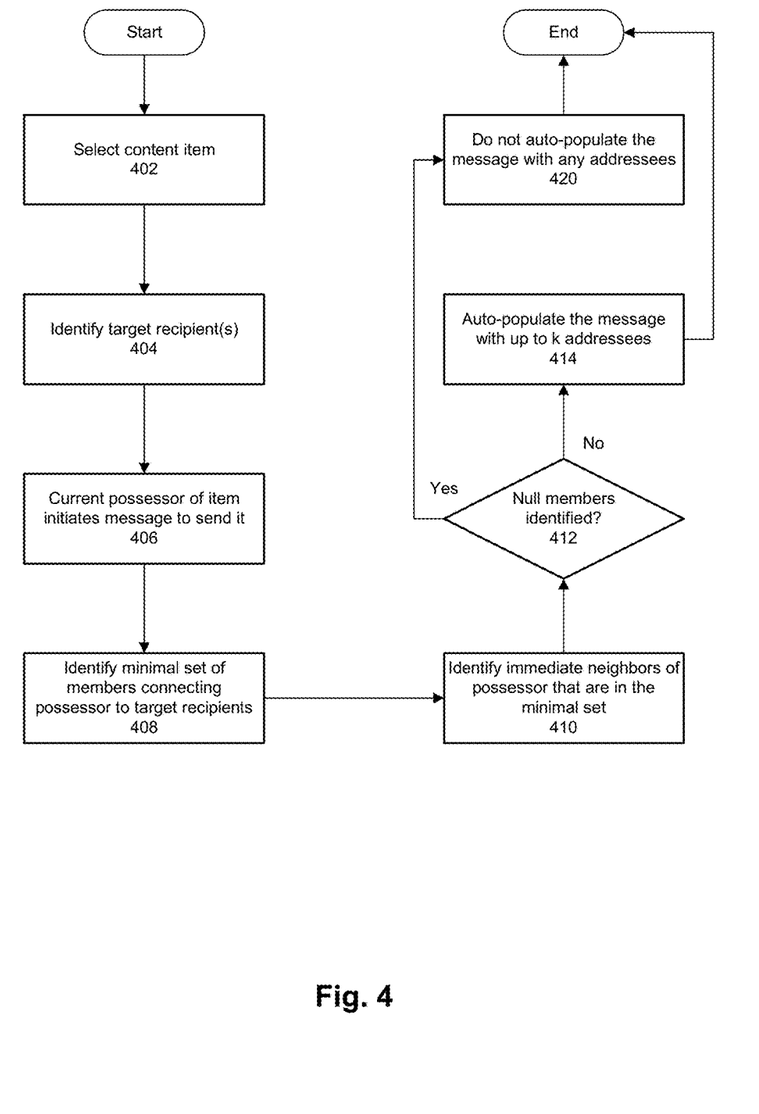
FIG. 4 is a flow chart demonstrating an inverted Steiner tree scheme for selecting addressees with which to automatically populate a message that will forward or otherwise convey a particular content item, in accordance with some embodiments.

FIG. 4 is a flow chart demonstrating an inverted Steiner tree scheme for selecting addressees with which to automatically populate a message that will forward or otherwise convey a particular content item, according to some embodiments. This method is employed within or in support of a professional network or social network comprising a large number of members and member connections.

In operation 402, a content item is identified for which auto-population of message addressee fields is to be applied. The item may be selected by a member, may be selected by the system (e.g., an operator of the system, a recommendation engine), or by some other entity. An item may be selected because a member or other user is sponsoring its distribution, because the system is doing so as a public service or to enhance its members' experiences with the service, and/or for some other reason.

In operation 404, one or more target recipients are identified. As discussed above, this may be performed in virtually any manner, using any suitable method, and may be performed by the same system that will auto-populate message addressee fields, or by some other entity.

For example, weights may computed for possible target recipients and the identified target recipients may be some number or percentage of possible target recipients having the highest weights. Alternatively, criteria may be specified for identifying target recipients, and the identified target recipients may include all members who match (or sufficiently match) the criteria.

In the illustrated embodiment, identifying target recipients yields binary results—each member is or is not a target recipient, and may be weighted accordingly (e.g., 0 or 1, respectively).

In operation 406, a current possessor of the content initiates a message to send or forward the selected content item.

In operation 408, the system begins a process of identifying suitable addressees with which to automatically populate the message. This method is termed an inverted Steiner tree because the system searches for a minimum number of nodes that connects the message sender to the target recipients, so that a minimum number of auto-populated messages will be required to reach all target recipients.

More particularly, in operation 408 the system identifies the smallest set of all members that connects the current sender to all target recipients that have not yet received the selected content item. Illustratively, all member subsets that connect the current sender to the remaining target recipients may be examined, and the smallest one is selected (or one of the smallest if there is a tie). An illustrative process for identifying a minimal set of members necessary to forward the content item from the current sender to all target recipients is described below; other processes may be applied in other embodiments.

In operation 410, the intersection of the current sender's immediate neighbors N and the set of members identified in operation 408 is determined, if any.

In operation 412, if the intersection is null, the system may proceed to operation 420 and refrain from auto-populating the message with any addressees. Alternatively, a different scheme may be applied for this sender (e.g., value function, community propagation).

Otherwise, in operation 414, up to k members in the intersection determined in operation 410 are selected. If the intersection includes more than k members, members may be selected randomly, by member weights, by applying a value function, or in some other manner. After operation 414 the method ends.

In some embodiments, an inverted Steiner tree process for identifying a minimal set of members through which a content item can be delivered to all target recipients from a current sender S proceeds as follows. As indicated above, N(S) represents neighbors of sender S within the member network.

First, a set M of members to reach is initialized to an empty set, and a reward function R(i) (wherein i is a member of the member network) is initialized to the value 1 for target recipients of the content item and the value 0 for all other members. Then, as long as R(S)<the number of target recipients, the following action is taken.

First, the most valuable member in the member network is added to M. In some implementations, the most valuable member is the member j who yields the maximum value V:

$$V(j) = \left( \sum_{n \in N(j)} R(n) - \text{distance}(S \cup M, j) \right)$$

The indicated distance function yields the shortest path between a member j and either S or a member of M.

Second, the reward function for member j is updated as follows:

$$R(j) = \sum_{n \in N(j)} R(n)$$

Third, reward functions for each neighbor i of member j are reset. In particular, for each neighbor i, R(i)=0.

Finally, when S chooses to send or forward the content item, all neighbors of S who are in the set M are automatically inserted as addressees. It may be noted that neighbors of S (i.e., members of N(S)) who are target recipients may not be added to the set M, but they will be automatically added as addressees.

In methods of automatically populating messages for conveying selected content items as described herein, different techniques may be applied to determine when to stop the auto-population. In some embodiments, the success of a campaign to distribute a content item to or among target recipients may be measured or estimated based on the observed tendency of recipients of the item to initiate messages to forward or re-convey it. That is, a relatively successful campaign will involve more transmissions and re-transmissions of a selected content item than a relatively unsuccessful campaign. The more successful a campaign involving a given content item is at any given time (e.g., when a member initiates a message to transmit the item), the more likely the system may be to continue auto-populating senders' messages with strategically selected addressees.

Figure 5:
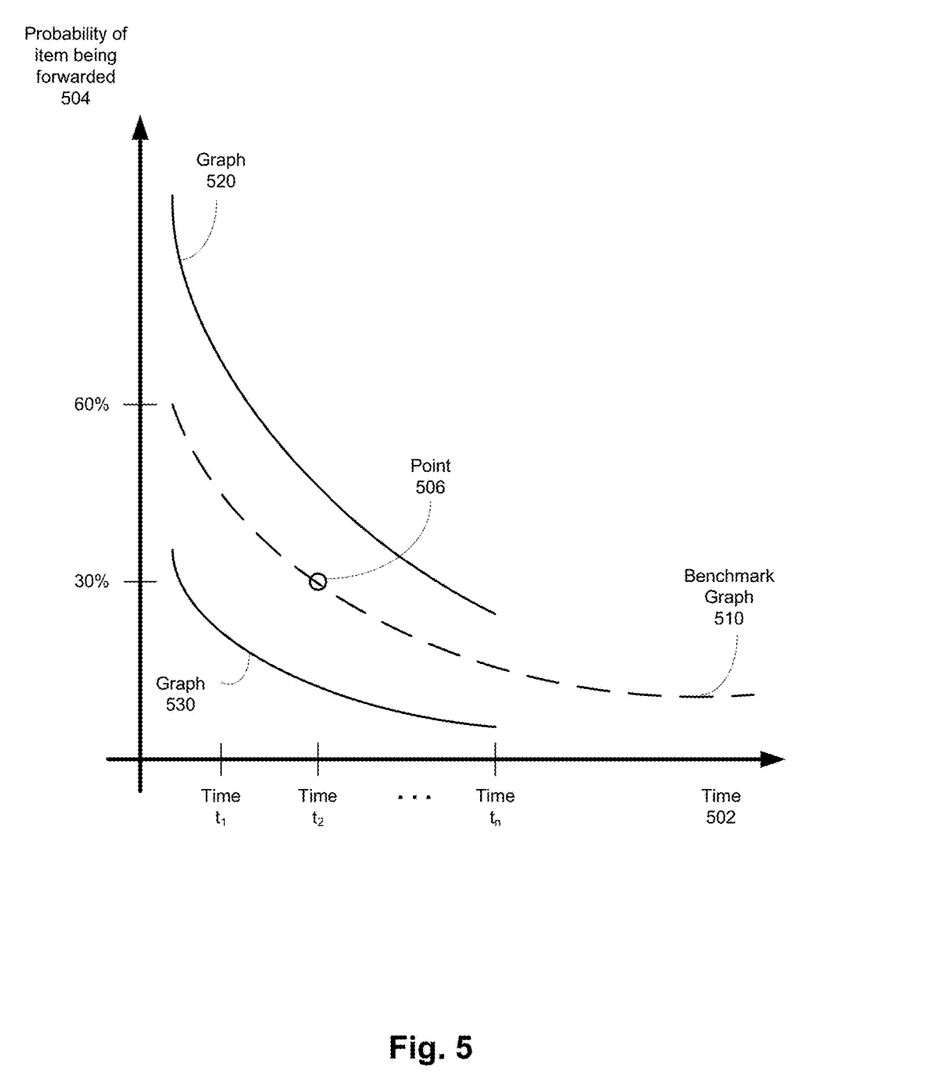
FIG. 5 depicts a benchmark graph for use in determining whether a given campaign to distribute a selected content item via messages having auto-populated addressee fields should be continued, in accordance with some embodiments.

FIG. 5 depicts a benchmark graph for use in determining whether a given campaign to distribute a selected content item via messages having auto-populated addressee fields should be continued, according to some embodiments.

Benchmark graph 510 demonstrates probabilities of transmission/re-transmission of a generic content item over time. In particular, the x-axis of the graph is indexed by time 502, while the y-axis represents probabilities 504 that a member who possesses the content item will initiate a message to further distribute it. For example, point 506 indicates that 30% of all members who had possessed the content item for the period of time corresponding to time $t_2$ had forwarded or re-conveyed it.

Benchmark graph 510 may represent some or all previous campaigns to distribute selected content items via messages whose addressee fields were auto-populated, and the actual frequencies or rates with which the items were conveyed. For example, in some implementations, selected content items may be categorized by type, media, target audience criteria, sponsor, and/or any other applicable characteristic. Separate benchmark graphs may be assembled for each category of content item to indicate the actual performance of recipients regarding re-transmission of the item.

Then, when a campaign for a given selected content item is underway, its actual performance can be compared to a benchmark that relates to or encompasses the content item. For example, graphs 520, 530 illustrate performances of campaigns for relatively successful and relatively unsuccessful campaigns, respectively, in relation to benchmark graph 510, for content items within the same category or categories represented by graph 510. As the graphs indicate, the content item associated with graph 520 enjoyed higher popularity than the content item associated with graph 530, in that more members who possessed it actually forwarded it.

Thus, at an illustrative current time $t_n$, the fact that the campaign corresponding to graph 520 outperforms benchmark graph 510 may support continued execution of the campaign, while the lagging performance of the campaign corresponding to graph 530 may justify its termination.

The performance of a campaign might be evaluated periodically, such as every day, and a determination made whether to continue. For example, as long as the actual performance exceeds some percentage of the benchmark (e.g., 60%, 100%), it may continue. Some campaigns, however, may have express minimum or maximum periods of time that they will run, and/or have other applicable criteria for determining whether to continue, such as a minimum number or percentage of target recipients that must be reached, a maximum number of automatically populated messages, a maximum number of hops from an originating member, etc.

Some specific schemes discussed above may have unique methods or mechanisms for determining when to terminate a campaign. For example, a "total value" may be specified for a campaign that employs a value function approach. In particular, a target total value may be identified that represents the accumulated values of all recipients of auto-populated messages. Thus, a sum is continually updated as auto-populated messages are delivered to new recipients, with each of those recipients having a calculated value as discussed above. When that sum matches or exceeds the target total value, the campaign may terminate (e.g., if that is the only termination criterion specified for the campaign).

In a community propagation approach, termination may be automatic within a given community once all members of the community have received the selected content item. Therefore, the content item's campaign may run for different periods of time within different communities.

Figure 6:
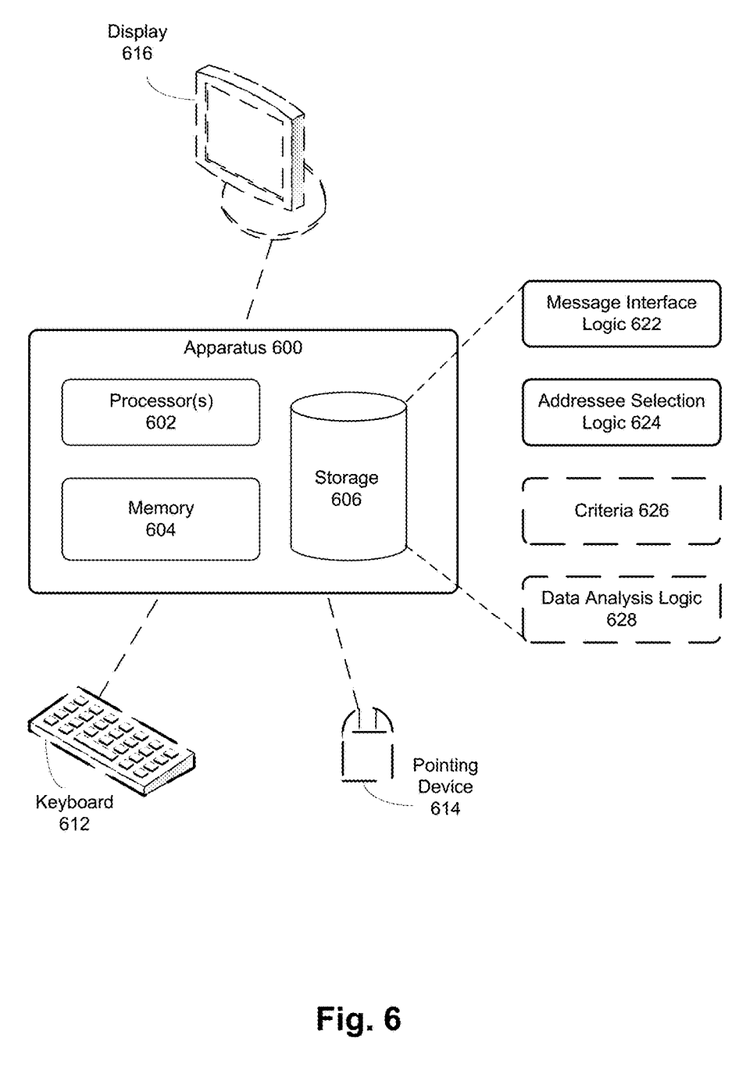
FIG. 6 is a block diagram of an apparatus for automatically populating an addressee field of a message initiated to transmit a selected content item, in accordance with some embodiments

FIG. 6 is a block diagram of an apparatus for automatically populating an addressee field of a message initiated to transmit a selected content item, according to some embodiments.

Apparatus 600 of FIG. 6 comprises processor(s) 602, memory 604, and storage 606, which may comprise one or more optical, solid-state, and/or magnetic storage components. Storage 606 may be local or remote to the apparatus. Apparatus 600 may be coupled (permanently or temporarily) to keyboard 612, pointing device 614, and display 616. Multiple apparatuses 600 may operate in parallel to cooperate in campaigns to distribute selected content items, and storage 606 may be shared among them, or may represent their combined secondary storage resources.

Storage 606 stores logic that may be loaded into memory 604 for execution by processor(s) 602. Such logic includes message interface logic 622 and addressee selection logic 624. In other embodiments, these logic modules and/or other content may be combined or divided to aggregate or separate their functionality as desired.

Message interface logic 622 comprises processor-executable instructions for adding one or more selected addressees to a member-generated or member-initiated message. Logic 622 may therefore include appropriate APIs for interacting with message application logic (e.g., an electronic mail program, an instant message program, a chat program) to deliver the addressee information, receiving notification that a member has initiated a message (with a selected content item attached or included), etc. In some embodiments, apparatus 600 may host or comprise the message application logic.

Addressee selection logic 624 comprises processor-executable instructions for selecting one or more addressees with which to automatically populate a member-generated message to convey a selected content item. As discussed above, logic 624 may implement just one scheme for selecting addressees, or may implement multiple different schemes (e.g., value function, community propagation, inverted Steiner tree).

Storage 606 may also contain data ancillary to implementation of one or more methods of selecting and automatically populating addressee fields with suitable addressees. Such data may include criteria 626 for identifying target recipients, for identifying communities that encompass target recipients, and/or for other purposes. These criteria may include member attributes, characteristics of selected content items, and/or other data.

Storage 606 may also contain operating parameters 628 that are not maintained by logic 622, 624, which may include data for determining whether and when to terminate a campaign for distributing a selected content item, weights/values of members, identities of communities that members belong to, operating constraints/restrictions, and so on.

In some embodiments of the invention, data apparatus 600 performs most or all of the functions described in relation to data server 122, and possibly message server 120, of FIG. 1. In some particular implementations, apparatus 600 may host multiple virtual computer servers performing the functions of servers 120, 122 (and/or others) of FIG. 1.

An environment in which some embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:
   (a) identifying multiple target recipients of a first content item to be distributed via automatically addressed messages;
   (b) upon notification of generation of a message comprising the first content item by a message initiator, operating one or more processors to:
      (b1) identify, within a network comprising the message initiator, a sub-network comprising first degree connections of the message initiator;
      (b2) select as addressees one or more of the first degree connections that have not previously received the first content item; and
      (b3) automatically address the message to the selected addressees;
   (c) determining whether conditions in a set of threshold conditions are satisfied;
   (d) repeating (b) and (c) as long as all conditions in the set of threshold conditions are satisfied; and
   (e) transmitting the message toward the selected addressees.

2. The method of claim 1, wherein (c) comprises:
(c1) comparing a current performance of the first content item to a benchmark performance of a first category of content items that encompasses the first content item;
wherein at least one threshold condition in the set of threshold conditions includes the current performance of the first content item exceeding a threshold percentage of the benchmark performance of the first category of content items.

3. The method of claim 2, wherein:
the current performance of the first content item corresponds to a current period of time the message initiator has possessed the first content item;
the current performance of the first content item comprises a percentage of recipients of the first content item that generated messages comprising the first content item only after having possessed the first content item for the period of time; and
the benchmark performance of the first category of content items represents a probability that a recipient of a content item of the first category will generate a message comprising the received content item only after having possessed the received content item for the period of time.

4. The method of claim 1, wherein (c) comprises:
(c1) determining a current portion of the target recipients that have received the first content item; and
(c2) comparing the current portion to a threshold portion;
wherein at least one threshold condition in the set of threshold conditions includes the current portion being less than the threshold portion.

5. The method of claim 1, wherein (c) comprises:
(c1) determining a current number of messages comprising the first content item that have been automatically addressed; and
(c2) comparing the current number of messages to a threshold number of messages;
wherein at least one threshold condition in the set of threshold conditions includes the current number of messages being less than the threshold number of messages.

6. The method of claim 1, wherein (c) comprises:
(c1) determining a current maximum number of network hops between an originator of the first content item and an automatically addressed addressee of a message comprising the first content item; and
(c2) comparing the current maximum number of network hops to a threshold maximum number of network hops;
wherein at least one threshold condition in the set of threshold conditions includes the current maximum number of network hops being less than the threshold maximum number of network hops.

7. The method of claim 1, wherein selecting one or more of the first degree connections comprises:
for each first degree connection, calculating an associated value of delivering the content item to the first degree connection; and
ranking the first degree connections by said calculated values.

8. The method of claim 7, wherein calculating a value associated with a given first degree connection comprises:
obtaining a weight corresponding to the given first degree connection, wherein the weight is proportional to similarities between characteristics of the content item and corresponding attributes of the first degree connection;
identifying first degree connections of the given first degree connection;
for each first degree connection of the given first degree connection, calculating a value of delivering the content item to the corresponding first degree connection;
summing the values of delivering the content item to the corresponding first degree connections of the given first degree connection;
multiplying the sum by a probability that the given first degree connection will initiate a message to transmit the content item, to yield a probable value; and
combining the probable value and the weight corresponding to the given first degree connection to yield the value associated with the given first degree connection.

9. The method of claim 7, wherein (c) comprises:
(c1) determining a current total value of the calculated values of recipients of the first content item; and
(c2) comparing the current total value to a target total value;
wherein at least one threshold condition in the set of threshold conditions includes the current total value being less than the target total value.

10. The method of claim 1, further comprising:
identifying one or more communities comprising the target recipients;
wherein selecting one or more of the first degree connections comprises:
if the message initiator is a member of an identified community, ranking the first degree connections by their connectedness within the identified communities.

11. The method of claim 10, further comprising:
if the message initiator is not a member of at least one identified community, rank the first degree connections by their proximities to the identified communities.

12. The method of claim 10, wherein (c) comprises:
(c1) determining whether all members of a first identified community have received the first content item;
wherein at least one threshold condition in the set of threshold conditions includes less than all members of the first identified community having received the first content item.

13. The method of claim 1, wherein selecting as addressees one or more of the first degree connections comprises:
identifying a minimal set of the first degree connections through which the message initiator is connected to the target recipients.

14. An apparatus, comprising:
one or more processors; and
a memory storing instructions that, when executed by the one or more processors, cause the apparatus to:
(a) identify multiple target recipients of a first content item to be distributed via automatically addressed messages;
(b) upon notification of generation of a message comprising the first content item by a message initiator:
(b1) identify, within a network comprising the message initiator, a sub-network comprising first degree connections of the message initiator;
(b2) select as addressees one or more of the first degree connections that have not previously received the first content item; and
(b3) automatically address the message to the selected addressees;
(c) determine whether conditions in a set of threshold conditions are satisfied;
(d) repeat (b) and (c) as long as all conditions in the set of threshold conditions are satisfied; and (e) transmit the message toward the selected addressees.

15. The apparatus of claim 14, wherein (c) comprises:
(c1) comparing a current performance of the first content item to a benchmark performance of a first category of content items that encompasses the first content item;
wherein at least one threshold condition in the set of threshold conditions includes the current performance of the first content item exceeding a threshold percentage of the benchmark performance of the first category of content items.

16. The apparatus of claim 15, wherein:
the current performance of the first content item corresponds to a current period of time the message initiator has possessed the first content item;
the current performance of the first content item comprises a percentage of recipients of the first content item that generated messages comprising the first content item only after having possessed the first content item for the period of time; and
the benchmark performance of the first category of content items represents a probability that a recipient of a content item of the first category will generate a message comprising the received content item only after having possessed the received content item for the period of time.

17. The apparatus of claim 14, wherein (c) comprises:
(c1) determining a current portion of the target recipients that have received the first content item; and
(c2) comparing the current portion to a threshold portion;
wherein at least one threshold condition in the set of threshold conditions includes the current portion being less than the threshold portion.

18. The apparatus of claim 14, wherein (c) comprises:
(c1) determining a current number of messages comprising the first content item that have been automatically addressed; and
(c2) comparing the current number of messages to a threshold number of messages;
wherein at least one threshold condition in the set of threshold conditions includes the current number of messages being less than the threshold number of messages.

19. The apparatus of claim 14, wherein (c) comprises:
(c1) determining a current maximum number of network hops between an originator of the first content item and an automatically addressed addressee of a message comprising the first content item; and
(c2) comparing the current maximum number of network hops to a threshold maximum number of network hops;
wherein at least one threshold condition in the set of threshold conditions includes the current maximum number of network hops being less than the threshold maximum number of network hops.

20. The apparatus of claim 14, wherein selecting as addressees one or more of the first degree connections comprises:
for each first degree connection, calculating an associated value of delivering the content item to the first degree connection; and
ranking the first degree connections by said calculated values.

21. The apparatus of claim 20, wherein calculating a value associated with a given first degree connection comprises:
obtaining a weight corresponding to the given first degree connection, wherein the weight is proportional to similarities between characteristics of the content item and corresponding attributes of the first degree connection;
identifying first degree connections of the given first degree connection;
for each first degree connection of the given first degree connection, calculating a value of delivering the content item to the corresponding first degree connection;
summing the values of delivering the content item to the corresponding first degree connections of the given first degree connection;
multiplying the sum by a probability that the given first degree connection will initiate a message to transmit the content item, to yield a probable value; and
combining the probable value and the weight corresponding to the given first degree connection to yield the value associated with the given first degree connection.

22. The apparatus of claim 20, wherein (c) comprises:
(c1) determining a current total value of the calculated values of recipients of the first content item; and
(c2) comparing the current total value to a target total value;
wherein at least one threshold condition in the set of threshold conditions includes the current total value being less than the target total value.

23. The apparatus of claim 14, the memory further storing instructions that, when executed by the one or more processors, cause the apparatus to:
identify one or more communities comprising the target recipients;
wherein selecting one or more of the first degree connections comprises:
if the message initiator is a member of an identified community, ranking the first degree connections by their connectedness within the identified communities.

24. The apparatus of claim 23, the memory further storing instructions that, when executed by the one or more processors, cause the apparatus to:
if the message initiator is not a member of at least one identified community, rank the first degree connections by their proximities to the identified communities.

25. The apparatus of claim 23, wherein (c) comprises:
(c1) determining whether all members of a first identified community have received the first content item;
wherein at least one threshold condition in the set of threshold conditions includes less than all members of the first identified community having received the first content item.

26. The apparatus of claim 14, wherein selecting as addressees one or more of the first degree connections comprises:
identifying a minimal set of the first degree connections through which the message initiator is connected to the target recipients.

27. A system for automatically populating a message with one or more selected addressees, the system comprising:
one or more processors;
network data describing a user network of nodes representing users and edges representing connections between users;
a recipient selection module comprising a non-transitory computer readable medium storing instructions executable by the one or more processors to:
identify multiple target recipients of a selected content itemto be distributed via automatically addressed messages;

an addressee selection module comprising a non-transitory computer readable medium storing instructions executable by the one or more processors to:
  select, when a message initiator initiates a message to convey the selected content item, one or more network neighbors of the message initiator who have not previously received the selected content item;
a message interface module comprising a non-transitory computer readable medium storing instructions executable by the one or more processors to:
  automatically address the message to the selected neighbors; and
  transmit the message toward the selected neighbors; and
a threshold condition module comprising a non-transitory computer readable medium storing instructions executable by the one or more processors to:
  determine whether conditions in a set of threshold conditions are satisfied; and
  after said automatic addressing of the message, allow repetition of said selection of one or more network neighbors of a message initiator, said automatic addressing of the message, and said determining whether conditions are satisfied if all conditions in the set of threshold conditions are satisfied.

28. The system of claim 27, wherein determining whether conditions in the set of threshold conditions are satisfied comprises:
  comparing a current performance of the selected content item to a benchmark performance of a first category of content items that encompasses the selected content item;
  wherein at least one threshold condition in the set of threshold conditions includes the current performance of the selected content item exceeding a threshold percentage of the benchmark performance of the first category of content items.

29. The system of claim 28, wherein:
  the current performance of the selected content item corresponds to a current period of time the message initiator has possessed the selected content item;
  the current performance of the selected content item comprises a percentage of recipients of the selected content item that generated messages comprising the selected content item only after having possessed the selected content item for the period of time; and
  the benchmark performance of the first category of content items represents a probability that a recipient of a content item of the first category will generate a message comprising the received content item only after having possessed the received content item for the period of time.

30. The system of claim 27, wherein determining whether conditions in the set of threshold conditions are satisfied comprises:
  determining a current portion of the target recipients that have received the selected content item; and
  comparing the current portion to a threshold portion;
  wherein at least one threshold condition in the set of threshold conditions includes the current portion being less than the threshold portion.

31. The system of claim 27, wherein determining whether conditions in the set of threshold conditions are satisfied comprises:
  determining a current number of messages comprising the selected content item that have been automatically addressed; and
  comparing the current number of messages to a threshold number of messages;
  wherein at least one threshold condition in the set of threshold conditions includes the current number of messages being less than the threshold number of messages.

32. The system of claim 27, wherein determining whether conditions in the set of threshold conditions are satisfied comprises:
  determining a current maximum number of network hops between an originator of the selected content item and an automatically addressed addressee of a message comprising the selected content item; and
  comparing the current maximum number of network hops to a threshold maximum number of network hops;
  wherein at least one threshold condition in the set of threshold conditions includes the current maximum number of network hops being less than the threshold maximum number of network hops.

33. The system of claim 27, wherein the system further comprises:
  criteria associated with the selected content item for identifying the target recipients.

34. The system of claim 33, wherein the system further comprises a community identification module comprising a non-transitory computer readable medium storing instructions executable by the one or more processors to:
  apply the criteria to identify one or more communities of users, within the user network, that comprise the target recipients.

35. The system of claim 34, wherein the system further comprises a ranking module comprising a non-transitory computer readable medium storing instructions executable by the one or more processors to:
  if the message initiator is a member of an identified user community, rank the network neighbors of the message initiator by their connectedness within the identified user communities; and
  if the message initiator is not a member of at least one identified user community, rank the network neighbors of the message initiator by their proximities to the identified user communities.

36. The system of claim 34, wherein determining whether conditions in the set of threshold conditions are satisfied comprises:
  determining whether all members of a first identified community have received the selected content item;
  wherein at least one threshold condition in the set of threshold conditions includes less than all members of the first identified community having received the selected content item.

37. The system of claim 27, wherein the non-transitory computer readable medium of the addressee selection module further stores instructions executable by the one or more processors to:
  promote distribution of the selected content item throughout the identified user communities but not beyond the identified user communities.

38. The system of claim 27, wherein the non-transitory computer readable medium of the addressee selection module further stores instructions executable by the one or more processors to:
  calculate, for each network neighbor of the message initiator, a value of delivering the selected content item to the neighbor.

39. The system of claim 38, wherein the system further comprises, for each network neighbor of the message initiator, a weight corresponding to a similarity between criteria associated with the selected content item for identifying the target recipients and corresponding attributes of the neighbor.

40. The system of claim 38, wherein determining whether conditions in the set of threshold conditions are satisfied comprises:
    determining a current total value of the calculated values of recipients of the selected content item; and
    comparing the current total value to a target total value;
    wherein at least one threshold condition in the set of threshold conditions includes the current total value being less than the target total value.

41. The system of claim 27, wherein the non-transitory computer readable medium of the addressee selection module further stores instructions executable by the one or more processors to:
    identify, for the message initiator, a minimal set of network neighbors of the first user through which the message initiator is connected to the target recipients.

42. The system of claim 27, wherein the user network is a professional social network.

* * * * *

UNITED STATES PATENT AND TRADEMARK OFFICE
CERTIFICATE OF CORRECTION

PATENT NO. : 9,836,543 B2
APPLICATION NO. : 14/626006
DATED : December 5, 2017
INVENTOR(S) : June H. Andres et al.

Page 1 of 1

It is certified that error appears in the above-identified patent and that said Letters Patent is hereby corrected as shown below:

On the Title Page

Please add Item (73), Assignee, --LinkedIn Corporation--

Signed and Sealed this
Fourth Day of September, 2018

Andrei Iancu
*Director of the United States Patent and Trademark Office*